Sept. 2, 1958  K. GEBELE ET AL  2,849,938
ACTUATING MECHANISM FOR PHOTOGRAPHIC OBJECTIVE SHUTTERS
Filed Oct. 7, 1955  3 Sheets-Sheet 1
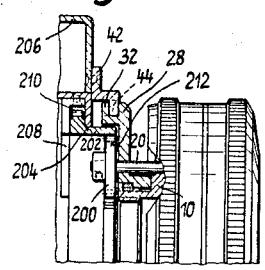
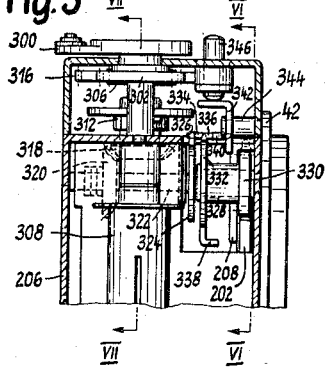
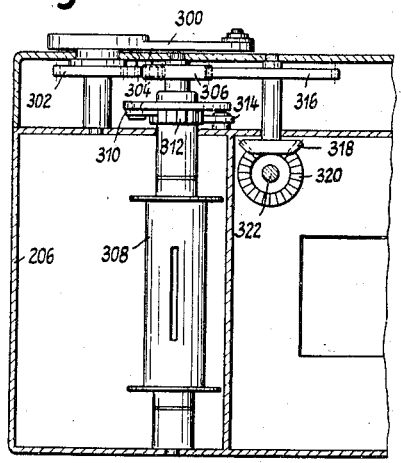
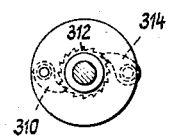
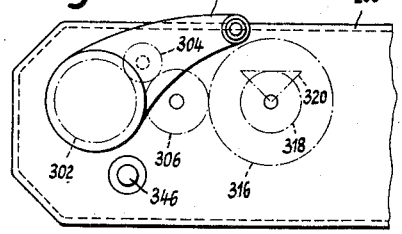

Sept. 2, 1958  K. GEBELE ET AL  2,849,938
ACTUATING MECHANISM FOR PHOTOGRAPHIC OBJECTIVE SHUTTERS
Filed Oct. 7, 1955  3 Sheets-Sheet 2
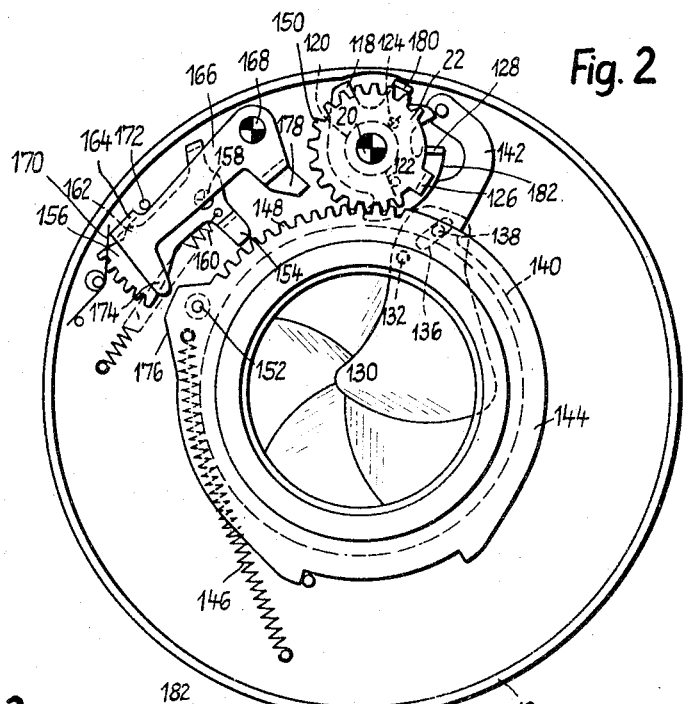
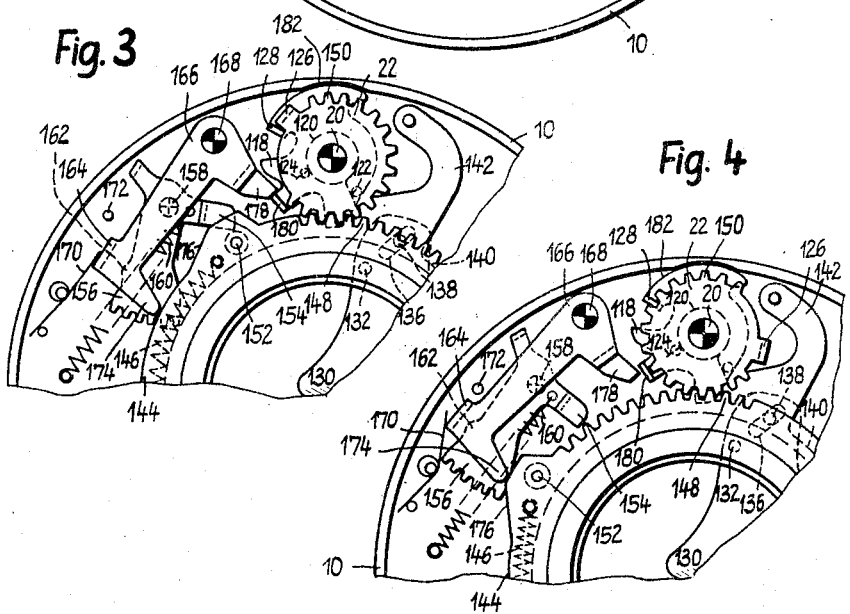

Sept. 2, 1958   K. GEBELE ET AL   2,849,938
ACTUATING MECHANISM FOR PHOTOGRAPHIC OBJECTIVE SHUTTERS
Filed Oct. 7, 1955   3 Sheets-Sheet 3
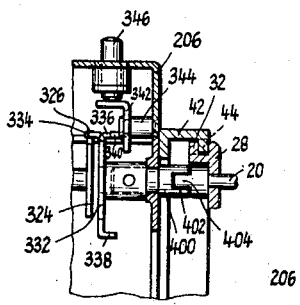
Fig. 13
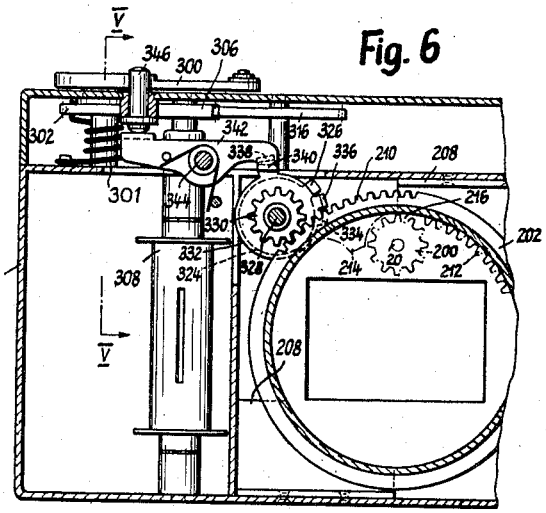
Fig. 6
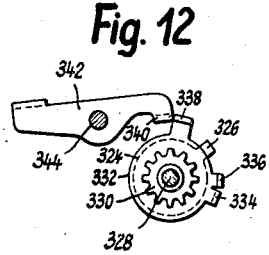
Fig. 12
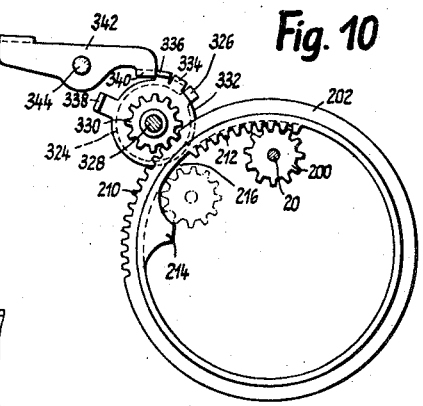
Fig. 10
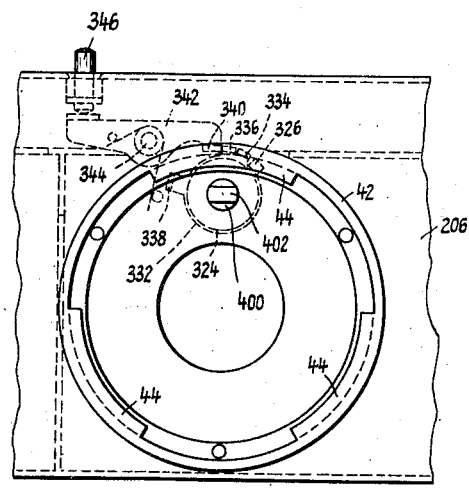
Fig. 14
Fig. 11

United States Patent Office 2,849,938
Patented Sept. 2, 1958

2,849,938

ACTUATING MECHANISM FOR PHOTOGRAPHIC OBJECTIVE SHUTTERS

Kurt Gebele and Franz Singer, Munich, Germany, assignors to Hans Deckel, Munich, Germany, and Friedrich Wilhelm Deckel, Zug, Switzerland Application October 7, 1955, Serial No. 539,202

Claims priority, application Germany October 8, 1954

6 Claims. (Cl. 95—63)

This invention relates to actuating mechanism for operating a photographic shutter, especially a shutter of the objective or between-the-lens type. An object of the invention is to provide generally improved and more satisfactory actuating mechanism.

Another object is to provide a particularly simple and suitable construction of actuating mechanism which can be installed, for example, in the body of the camera with which the shutter is used, and which will function effectively to actuate the shutter through its necessary movements at the proper time.

Another object of the invention is the provision of simplified actuating mechanism capable of being used when taking bulb exposures as well as ordinary instantaneous exposures.

A further object is the provision of actuating mechanism which includes a simple kinematic chain of actuating members forming a connection between a suitable part of the camera body and a suitable part of the shutter structure, the kinematic chain including multiple parts or locking means for use both in instantaneous exposures and in bulb exposures.

These and other desirable objects may be attained in the manner disclosed as an illustrative embodiment of the invention in the following description and in the accompanying drawings forming a part hereof, in which:

Fig. 1 is a fragmentary view partly in side elevation and partly in vertical section on a plane parallel to the optical axis of the shutter, showing the shutter and the front part of the camera body;

Fig. 2 is a front face view of a shutter of the kind preferably employed with the actuating mechanism of the present invention, with the front plate of the shutter removed to show the mechanism beneath, and with various parts omitted, the shutter being illustrated in its run-down or rest position at the conclusion of making an exposure;

Fig. 3 is a view similar to a fragment of Fig. 2, showing the shutter in tensioned or cocked position;

Fig. 4 is a view similar to Fig. 3 showing the shutter parts in the position assumed just after the master member has been released or tripped for making an exposure;

Fig. 5 is a fragmentary vertical section through the same camera body partially shown in Fig. 1, the section being taken approximately on a vertical plane parallel to the optical axis of the shutter approximately as indicated by the line 5—5 in Fig. 6;

Fig. 6 is a vertical section through the camera body approximately on a plane perpendicular to the optical axis and substantially on the line 6—6 of Fig. 5;

Fig. 7 is a somewhat similar section taken substantially on the line 7—7 of Fig. 5;

Fig. 8 is a fragmentary top plan view of the camera body;

Fig. 9 is a plan of certain film feed driving parts within the camera body;

Fig. 10 is a view similar to a fragment of Fig. 6, showing the parts in a different position;

Fig. 11 is a view partly in plan and partly in radial section of a control ring shown in Figs. 6 and 10;

Fig. 12 is a view similar to a fragment of Figs. 6 and 10, showing the parts in a different position;

Fig. 13 is a view similar in general to Fig. 1 but showing a modified form of construction; and Fig. 14 is a view similar in general to Fig. 6, but showing the same modified construction which is illustrated in Fig. 13.

The same reference numerals throughout the several views indicate the same parts.

The actuating mechanism of the present invention is especially suitable for use with a photographic objective shutter in which both the cocking or tensioning of the shutter and the release or triggering thereof are accomplished through a single shaft extending rearwardly from the shutter into the camera body with which the shutter is used. The exact details of the interior construction of the shutter are not important for purposes of the present invention, and they may be varied to a considerable extent, so long as the working parts are so constructed as to operate the shutter through the single shaft above mentioned. For the purpose of disclosing one shutter construction which is suitable, however, reference may now be made especially to Figs. 2–4 of the drawings, illustrating a shutter having a casing 10 containing the shutter mechanism and provided with the cocking and release shaft 20 extending approximately parallel to but offset from the optical axis of the shutter, and passing out through the rear wall of the shutter casing and into the camera body, as seen in Fig. 1. A tensioning disk 22 is fixed on the shaft 20 near its forward end. Below or to the rear of the disk 22 there is rotatably mounted on the shaft 20 of the main driving member or master member 118 of the shutter, driven by a main driving spring or master spring 120 wound around the shaft 20 and having one end 122 held fast on a fixed part of the shutter casing while the other end 124 is connected to the master member 118. When the tensioning shaft 20 and tensioning disk 22 are turned in a counterclockwise direction (viewed from the front of the shutter as in Figs. 2–4) a rearwardly extending projection or ear 126 on the tensioning disk 22 engages a lug 128 on the master member 118 and turns the master member correspondingly in a counterclockwise direction, winding up or tensioning the spring 120. When the spring becomes fully wound and the master member reaches its fully tensioned position, it is latched in such position by a nose 178 on the latching pawl 166 engaging a lug 180 on the master member, as further mentioned below.

The shutter is provided with any suitable number of blades 130 movable to open and closed positions for making an exposure, each blade being pivoted at 132 to some suitable part of the shutter. Each blade also has a slot 136 engaged by a pin 138 on the blade ring 140 which is rotatable in the shutter housing about the optical axis of the shutter as a center, and which is provided with an arm 142 extending somewhat radially outwardly and carrying two driving pins or projections which cooperate in known manner (the details of which are not important for present purposes) with the master member 118 in such manner that when the master member runs down in a clockwise direction from tensioned position to rest position, it will move the arm 142 and blade ring 140 first in a counterclockwise direction to open the shutter blades 130, and then in a clockwise direction to close the blades again, turning them on their pivots 132.

The shutter casing also contains a control ring 144 rotatable about the optical axis of the shutter as a center and preferably having a bearing support on the front lens tube of the shutter, and lying substantially in the same transverse plane with the tensioning disk 22 on the shaft 20. A spring 146 constantly tends to turn the control ring 144 in a counterclockwise direction. On part of its periphery, the control ring 144 has gear teeth 148 which mesh with corresponding gear teeth 150 on part of the periphery of the tensioning disk 22, so that when the tensioning shaft 20 and disk 22 are turned in a counterclockwise direction to tension the shutter, the gear teeth will drive the control ring 144 in a clockwise direction. In the particular shutter now being described, the parts are maintained in tensioned or cocked position by a suitable latch mounted within the camera body, as explained below, and operatively connected to the shaft 20.

During the clockwise turning of the control ring 144 from the rundown or rest position shown in Fig. 2, to the tensioned position shown in Fig. 3, a pin 152 on the control ring engages the nose 154 of a toothed sector 156 pivoted in the shutter casing at 158 and provided with a spring 160 which tends to turn the sector in a clockwise direction. The gear teeth on the sector are in engagement with a clockwork escapement mechanism (not shown) of known type, so that the running down motion of the sector in a clockwise direction is retarded by the escapement mechanism.

A projection 162 on the sector 156 may at times press against a lug or ear 164 on a latching pawl or lever 166 pivoted in the casing at 168 and influenced in a counterclockwise direction by a light spring 170 which tends to keep the ear 164 engaged with the part 162. The spring 160 of the gear sector is stronger than the spring 170 of the latching pawl, so that, except when engaged and restrained by other parts, the spring 160 swings the gear sector and carries the latching pawl with it to the end position or rest position determined by the stationary pin stop 172, as seen in Fig. 2.

The latching pawl 166 also has a nose or projection 174 cooperating with an inclined cam surface 176 on the control ring 144, and a latching nose 178 which can drop behind a lug 180 of the master member 118 to hold the same in tensioned position, as already briefly mentioned above.

The master member 118 also carries a projection 182 cooperating with a clockwork escapement mechanism (not shown) which is arranged in the shutter housing in such manner as to regulate the running down time or speed of running down of the master member, thereby to vary the exposure time of the shutter in known manner, the details of which are not important for present purposes. As usual, the retardation time of this escapement mechanism may be adjusted or altered to give exposures of different durations, adjustment being effected by rotating the exposure setting ring or speed adjusting ring 16 shown in Fig. 1.

A bayonet connection plate 28 (Fig. 1) is secured to the shutter and has bayonet connection ears 32 cooperating with bayonet connection lugs 44 on the bayonet connection plate 42 mounted on the front wall of the camera body 206, as shown in Fig. 1. A pinion 200 (Figs. 1, 6, and 10) is fixed to the rear end of the shutter shaft 20 in position to mesh with internal gear teeth 212 extending around part of the inner circumference of a short tubular ring gear 202 which is mounted for rotation coaxial with the optical axis in a circular opening 204 in the front wall of the camera body 206, and which serves as the adjustable connecting member or control member on the camera, for controlling both the tensioning of the shutter and the release of the shutter to make an exposure.

This connecting member or control ring 202 is held against axial displacement relative to the camera body by means of two small holding plates 208 (Figs. 5 and 6) secured within the camera body. In addition to the internal gear teeth 212, the ring 202 also carries external gear teeth 210 extending through part of its circumference and meshing with the teeth of a pinion 330 which serves to turn and control the ring for tensioning and release purposes as further explained below. The ring 202 also has an internal locking flange or nose 214 lying in the same plane with the internal teeth 212, but spaced from them in a counterclockwise direction by a gap 216 sufficiently large so that this space can receive the pinion 200 with a reasonable amount of play, as seen in broken lines in Figs. 6 and 10.

This control ring 202 performs several functions. First, it serves to transmit both the tensioning or cocking motion and the release motion from the appropriate control parts within the camera body to the appropriate responsive parts of the objective shutter. Second, it serves to lock the objective shutter to the camera body in such manner that the shutter can be removed from the camera body only when the cooperating parts are in a given condition or situation, e. g., a condition in which the shutter is fully tensioned. Third, it provides for automatic tensioning of the shutter during the motion of placing the shutter on the camera, and for automatic release of the shutter from tensioned position to released or rundown position by the motion of removing the shutter from the camera, so that while the shutter is laid aside and not in use, it remains in rundown or rest condition, yet is automatically tensioned again when it is put back on the camera.

The first of these functions is fulfilled by the ring 202 simply by the fact that it has two toothed portions, one of which is in driven relation to what may be called the camera body mechanism and the other of which is in driving relation to what may be called the shutter mechanism. The second and third functions above mentioned are performed by the control ring 202 in that, due to the locking nose 214, the ring permits removal of the shutter only when the ring is in a certain predetermined position, and due to the gear teeth 212, the rotary motion of the shutter during removal serves to rotate the shutter gear 200 and thereby release the shutter for movement from tensioned position to rest or rundown position.

When the ring 202 is in the rest or rundown position as seen in Fig. 6, the locking nose 214 lies just to the left of the shutter pinion 200 and prevents the shutter from being rotated leftwardly to disengage the bayonet lugs of the shutter from the bayonet lugs on the camera. When the ring 202 has been turned to the tensioned or cocked position shown in Fig. 10, the shutter is tensioned and the locking nose 214 is sufficiently far to the left of the pinion 200 so that the shutter may be turned leftwardly or counterclockwise, to disengage the bayonet lugs and remove the shutter from the camera body. But the mere fact of turning the shutter in a counterclockwise direction to disengage it from the camera, will cause the pinion 200 to travel on the gear teeth 212 so as to turn the shaft 20 in a rightward or clockwise direction, thereby causing the shutter to run down to its rest position during the act of removal. Correspondingly, when the shutter is put back on the camera, the rightward motion of the pinion 200 from the broken line position to the full line position shown in Fig. 10, will cause the pinion to be rotated counterclockwise to tension the shutter again by the mere act of installing it on the camera.

The camera body mechanism for operating and controlling the ring 202 will now be described with reference particularly to Figs. 5–12 of the drawings. There is installed at the top of the camera body a film advance lever 300 which is urged clockwise by a light spring 301. When the lever is swung in a counterclockwise direction (when viewed from above as in Fig. 8) it drives a gear train 302, 304, 306 for turning the film winding spool 308 or other suitable film feeding roller. A pawl and ratchet mechanism best seen in Fig. 9 is operatively interposed between the gear 306 of the film feed member 308, this mechanism comprising a disk 309 turning with the gear 306 and carrying a pawl 310 which engages a ratchet 312 on the shaft of the film feed member 308, to turn the member 308 in a counterclockwise or feeding direction when the gear 306 and disk 309 are moved counterclockwise. When the handle 300 is restored to its initial position and the gear 309 moves clockwise, the pawl 310 simply ratchets idly over the ratchet teeth 312, which are then held against reverse motion (to keep the film stretched tightly) by a holding pawl 314 mounted on a fixed part of the camera body.

The film driving gear 306 meshes also with and drives a gear 316, the vertical shaft of which drives a bevel gear 318 meshing with and driving a second bevel gear 320 on a horizontal shaft 322. This shaft 322 lies substantially parallel to the optical axis of the camera and shutter, and is fixed to a driving disk 324 having a radial projection 326. In front of the shaft 322 and coaxial with it is a pivot pin 328 fixed in the camera, on which is rotatably mounted a pinion 330 meshing with the external gear teeth 210 on the control ring 202. A locking disk 332 is fixed to the pinion 330 to turn with it, this disk lying fairly close to the driving disk 324.

This locking disk 332 has a rearwardly bent ear or lug 334 intersecting the plane of the disk 324 in position to be engaged and driven by the driving arm 326 thereof. The disk 332 also carries two forwardly bent ears or lugs 336 and 338, the latter being at a greater radial distance from the pivot 328 than the former. Both of these ears 336 and 338 cooperate under certain conditions with a rearwardly bent ear or lug 340 on the double armed release lever 342 pivoted in the camera body on the pivot 344 and influenced by a light hairpin spring as seen in Fig. 6, tending to turn the release member 342 in a clockwise direction (when viewed from the front as in Fig. 6) to keep the left end thereof in engagement with the lower end of a release plunger 346 which is mounted for limited vertical sliding movement in the top wall of the camera body, and which has its upper end projecting to a position accessible to the finger of the operator.

The operation of these parts is as follows: The rest position of the parts after taking a picture is shown in Fig. 6. If the film feed lever 300 is now turned in a counterclockwise direction (when viewed from above as in Fig. 8) the film will be advanced or transported through the length of one picture frame, any suitable measuring mechanism and stop mechanism (not shown) of known form being employed to determine the exact amount of film which is fed. At the same time, the motion of the lever 300 will drive the shaft 322 and the disk 324 in a clockwise direction, when viewed from the front as in Figs. 6, 7, 10, and 12. The radial driving arm 326 on the disk 324 will engage the rearward ear 334 of the locking disk 332 and will turn this locking disk in a clockwise direction, likewise turning the pinion 330 which is fixed to the locking disk, so as to cause counterclockwise turning of the control ring 202 and corresponding counterclockwise turning of the shutter pinion 200 and its shaft 20, thereby tensioning or cocking the shutter in the manner already mentioned, from the rest position of Fig. 2 to the tensioned position of Fig. 3. In this position, the master member 118 is held in tensioned position by the latching pawl 178 which is free to swing to latching position because the pin 152 engages the tail 154 to swing the sector 156, 162 away from the ear 164 of the latching pawl 178. The shaft 20, disk 22, and control ring 144 are held in tensioned position by the engagement of the pinion 200 with the gear teeth 212.

Upon this tensioning or clockwise rotation of the disks 324 and 332, the ear 336 of the latter comes into engagement with the ear 340 on the release lever 342, swings this release lever slightly in a counterclockwise direction on its pivot 344, and finally drops back of the ear 340 just to the right thereof, in the position shown in Fig. 10. When the operator releases the displacing force on the film feeding arm 300 and the spring 301 restores this arm to its initial or rest position, the shaft 322 and disk 324 turn back to their initial rest positions, but the disk 332 and pinion 330 are held in tensioned or cocked position because of the engagement of the ear 336 on the disk with the ear 340 of the release lever 342.

When the operator is ready to take the picture, he presses downwardly on the plunger or button 346, thus depressing the left end and raising the right end of the release lever 342, so that the ear 336 of the disk 332 can now slip past the ear 340 and the disk 332 and pinion 330 can rotate counterclockwise, with corresponding clockwise rotation of the control ring 202 and clockwise rotation of the shutter pinion 200, shutter shaft 20, and pinion 22, under the influence of the spring 146 acting on the control ring 144 within the shutter. If the operator maintains his finger pressure on the release button 346, this rotation of the parts continues only until the ear 338 on the disk 332 strikes the ear 340 on the release lever, as shown in Fig. 12, and stops rotation of the disk 332 and other parts connected therewith, close to but not quite at the fully run-down position.

It is well known with shutters to provide a mechanism, which keeps the shutter blades in an open position, if the shutter is set to "B" or "bulb" exposure, as long as the shutter actuator is pressed by the operator. Such an arrangement has by way of example been described in the U. S. Letters Patent No. 1,687,123 (Deckel et al.). The shutter according to the present invention does not provide a release actuating member to be operated by hand but only a shaft which is driven by other members located on the camera. This shaft serves to tension or cock the shutter when turned in one direction and rotates in the other direction when released, thus permitting release of the shutter. In order to permit "B" exposures it is thus necessary to provide an abutment member cooperating in the manner above explained with the shaft which serves to hold the shaft during the release movement in an intermediate position. In this intermediate or intercepted position of the shutter shaft 20 and of the other parts, the shutter blades remain open, if the shutter is set for "bulb" exposures, so that a "bulb" exposure is made, having a duration as long as the operator maintains the button 346 in its depressed position. However, when the operator releases pressure on the button 346 so that the spring of the lever 342 restores the lever to its normal position, then the ear 338 can slip past the lever and the parts will return from their partially run-down position of Fig. 12 to the fully run-down position of Fig. 6, fully closing the blades.

The use of a control ring 202 as an intermediate connection member between the operative parts in the camera body and the operative parts of the shutter itself, has several advantages, some of which have already been mentioned. Additionally, it permits the design of the camera in such a way as to attain any desired spatial relationship between the position of the shaft 20 of the shutter and the position of the shaft 328 of the camera. Also, the construction of the ring 202 may be varied as necessary in order to accommodate shutters of varying size, and may be made, for example, longer or shorter in an axial direction. Also, the ring could have, if desired, only a single set of gear teeth engaged both by the shutter pinion 200 and the camera pinion 330, if preferred, instead of two separate sets of teeth. Thus a very compact construction is possible, using the control ring 202 or reasonable variations thereof.

Although it is preferred, in carrying out the present invention, to use the control ring 202 on account of the advantages above explained, and to place the locking disk 332 in the particular location in the kinematic chain of mechanisms as described above, yet it is possible according to a modification of the invention to omit the control ring 202 and to place the locking disk 332 in a different location in the kinematic chain. Such a modified form of the invention is shown in Figs. 13 and 14, wherein the locking disk 332 is fastened securely to the shaft of a driving dog or clutch tooth member 400 having a diametrically extending coupling slot 402 adapted to engage with a diametrical coupling tooth 404 on the rear end of the cocking shaft 20 of the shutter. As before, the shutter is attachable to and detachable from the camera body by means of bayonet connection parts 28, 32 on the shutter and cooperating bayonet connection parts 42, 44 on the front of the camera housing. As the entire shutter assembly is turned relative to the camera body to connect or disconnect the bayonet connection parts in mounting or demounting the shutter, the diametrical tooth 404 on the shaft 20 slides into or out of the notch 402 on the hub 400, establishing or disconnecting the driving connection between the parts. In other respects, the operation is the same as previously described, and the locking disk 332 with its various lugs 334, 336, and 338 operates exactly the same way and cooperates in the same manner with the pawl 342, as previously described.

Certain subject matter disclosed but not claimed herein is claimed in the copending United States patent applications of Kurt Gebele (one of the joint applicants of this present application) Serial No. 509,929, filed May 20, 1955, and Serial No. 514,218, filed June 9, 1955.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic objective shutter and camera construction comprising a camera body, a shutter housing mounted on said camera body, a shutter operating master member mounted within said shutter housing and movable from a run-down position to a tensioned position and vice versa, a control shaft mounted at least partly within said camera body and operatively connected to said master member and rotatable in one direction to tension the shutter ready for an exposure and rotatable in the opposite direction to release the shutter for making an exposure, spring means tending to turn said shaft in said opposite direction, a latching pawl located in said camera body, abutment means on said shaft within said camera body for cooperating with said pawl to hold said shaft in a position corresponding to full tensioning of the shutter, and other abutment means on said shaft also within said camera body for cooperating with said pawl to hold said shaft in an intermediate position of rotation in said opposite direction.

2. The combination with a photographic camera body, of a shutter housing attached to said body, shutter blade operating mechanism within said housing, said mechanism including a master member rotatable in one direction from a run-down position to a tensioned position and rotatable in the opposite direction first to open and then to close the shutter blades, an actuating shaft extending from said shutter housing into said body, said shaft being rotatable in one direction to tension said shutter for making an exposure and rotatable in the opposite direction to release the tensioned shutter to make an exposure, and a kinematic chain of driving mechanism within said camera body for turning said shaft in said two directions, said kinematic chain including a locking disk having a plurality of projections, a locking pawl, and a shutter release member on said camera body operatively connected to said locking pawl in such manner that when said release member is in one position, said pawl engages one of said projections of said disk to hold said shaft in one position, and when said release member is in a different position, said pawl engages another of said projections to hold said shaft in a different position.

3. A construction as defined in claim 2, in which said one position of said shaft is a position in which said shutter is fully tensioned ready for making an exposure.

4. A construction as defined in claim 2, in which said different position of said shaft is an intermediate position.

5. A construction as defined in claim 4, in which said shutter is open for making a "bulb" exposure as long as said shaft remains in said intermediate position.

6. The combination of a photographic camera body, a shutter housing mounted on said body, a plurality of movable shutter blades mounted in said housing, a rotatable master member within said housing and a power spring operatively connected thereto, said master member being rotatable in one direction from a run-down position to a tensioned position and serving to tension said power spring during such rotation, said master member also being rotatable in the opposite direction from tensioned position to run-down position and serving during such rotation first to open and then to close said shutter blades, a releasable latch within said shutter housing for holding said master member in tensioned position, a rotatable setting member within said housing, said setting member being rotatable between two extreme positions and having a part engaging said master member during rotation of said setting member in one direction to rotate said master member from run-down position to tensioned position, said setting member being thereafter capable of reverse rotation while leaving said master member latched in its tensioned position, a control ring rotatably mounted within said shutter housing, gear means operatively connecting said control ring to said setting member to turn therewith, means controlled by said control ring for releasing said latch of said master member, rotary shaft means operatively connected to said setting member and extending into said camera body, means in said body for turning said shaft means to turn said setting member in its first direction to tension said master member, two latch abutments fixed to said shaft means within said camera body and angularly spaced from each other in the direction of rotation of said shaft means, and a movable latch member within said camera body separate from said latch within said shutter housing, said latch member in said camera body having one position for engaging one of said abutments to hold said shaft means and setting member in a position corresponding to full tensioning of said master member and having another position for engaging the other of said abutments to retain said shaft means and setting member in an intermediate position effective to stop the running-down rotation of said master member in an intermediate position in which the shutter blades have been opened and not yet closed.

References Cited in the file of this patent

UNITED STATES PATENTS

| | | |
|---|---|---|
| 2,105,228 | Riddell | Jan. 11, 1938 |
| 2,298,787 | Fassin | Oct. 13, 1942 |
| 2,359,116 | Johnson | Sept. 26, 1944 |

FOREIGN PATENTS

| | | |
|---|---|---|
| 473,097 | Italy | July 11, 1952 |